C. F. JENKINS.
FILM REEL.
APPLICATION FILED JULY 9, 1919.
1,322,114.
Patented Nov. 18, 1919.
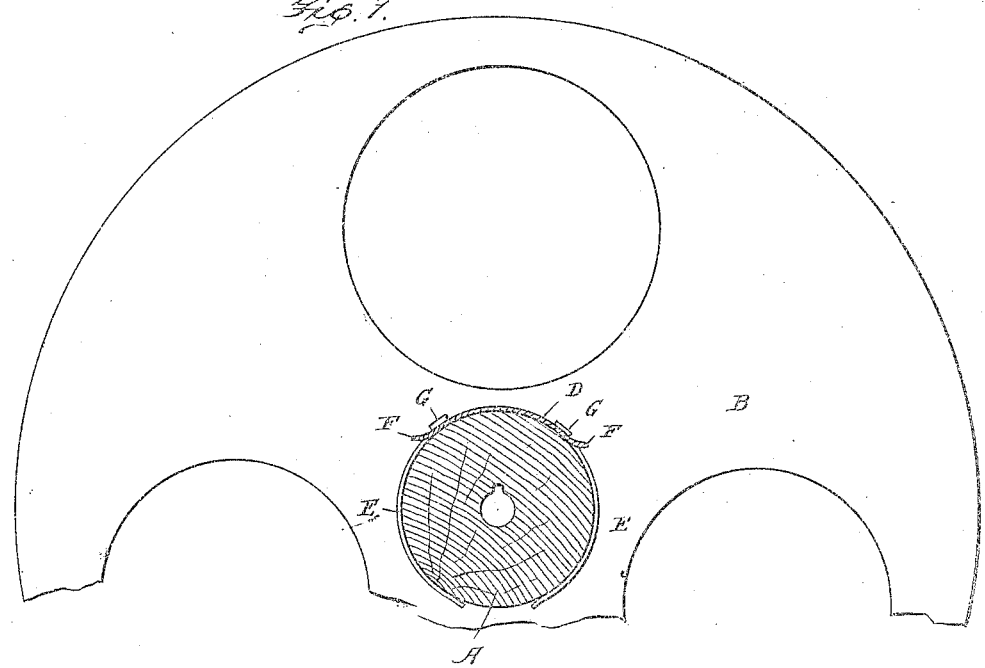
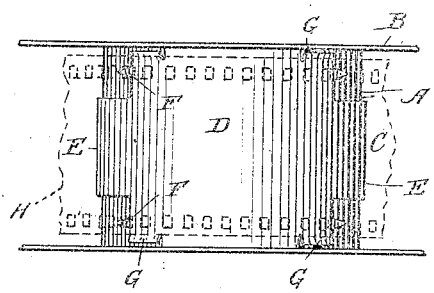
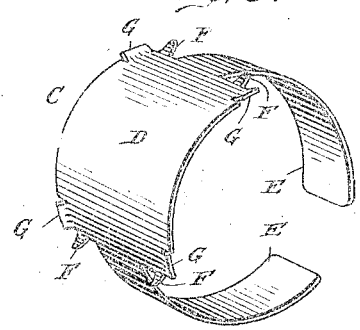
Witness
Edwin L. Bradford
Inventor
Charles Francis Jenkins.
By Keene & Keene,
Attorneys

UNITED STATES PATENT OFFICE.

CHARLES FRANCIS JENKINS, OF WASHINGTON, DISTRICT OF COLUMBIA.

FILM-REEL.

1,322,114.  Specification of Letters Patent.  Patented Nov. 18, 1919.

Application filed July 3, 1919. Serial No. 308,721.

*To all whom it may concern:*

Be it known that I, CHARLES FRANCIS JENKINS, a citizen of the United States, and resident of Washington, in the District of Columbia, have invented certain new and useful Improvements in Film-Reels, of which the following is a specification, reference being had therein to the accompanying drawing.

This invention relates to film reels such as are used in motion picture work and particularly to means whereby the loose end of a film may be quickly secured to the hub of the reel even when the latter is in motion.

In the accompanying drawings.

Figure 1 is a side view of a film reel, one flange being broken away to show the hub and a metal clip loosely encircling the same.

Fig. 2 is a view showing from above the devices of Fig. 1.

Fig. 3 is a perspective view of the clip of Fig. 1.

In these figures, A represents the drum and B, B the flanges of a common reel, and C a light spring metal clip having its middle portion D nearly as wide as the space between the flanges and the end portions preferably cut away on each side so as to leave a narrow central portion E, which very lightly clasps the drum.

The wider central portion D is provided, preferably at each end, with two outwardly turned teeth F adapted in size and position to enter the perforations in a common film strip, and is further provided with upturned marginal lugs G at its outer angles to serve for guiding the strip into central position on the hub or drum of the reel.

If a film strip H be laid upon the drum between the flanges when the drum is in motion the teeth F enter the perforations in the strip and the drum at first slips in the loose clip and no sudden tearing strain is exerted upon the film. But the slight friction of the light clip upon the drum is enough to cause loose winding of the film and after one or two turns the film grips the drum and moves with it winding the film. There is thus automatic engagement of the film and of course automatic disengagement when the film is unwound, and the teeth never injure the film.

If the drum be not rotating, the film may be laid upon it, regardless of the position of the teeth, and manually giving the reel one or two turns will securely engage the film. Thus the film is easily and quickly attached under any and all conditions.

For attaching to a rapidly rotating reel it is essential that the clip slip easily upon the drum, but it is not essential that the teeth which it bears be spurs integral with and bent up from the metal of the clip's body, nor that the clip be of sheet metal.

It may be noted that it is quite possible to attach the film by inserting its end under the end of one of the members E, and thus the film is readily attached by the most thoughtless person unfamiliar with the construction and operation set forth.

What I claim is:

1. The combination with a film reel, of a readily compressed member encircling the reel drum, in light frictional engagement therewith and provided with external devices for engaging a tangential film laid lightly thereon; whereby the film so placed begins loose winding upon the rotating drum and gradually tightens its grip in pressing said member against the drum's surface.

2. The combination with a film reel drum, of a film engaging device having slight frictional engagement with the drum, whereby while slipping upon the rotating drum it may cause film to wind loosely about the same.

3. The combination with a film reel drum, of a light spring clip in slipping engagement with the drum and adapted to engage a film laid upon the drum and cause it to wind loosely about the latter.

4. The combination with a film reel drum of a loose spring clip slightly gripping the drum and provided with teeth for engaging the perforations of a film.

5. The combination with a film reel drum, of a film engaging spring clip encircling and slightly gripping the drum and provided with projections for guiding to central position a film laid upon it.

In testimony whereof I hereunto affix my signature.

CHARLES FRANCIS JENKINS.